United States Patent
Lee et al.

(10) Patent No.: US 12,373,128 B2
(45) Date of Patent: *Jul. 29, 2025

(54) MEMORY CONTROLLER, STORAGE DEVICE AND OPERATING METHOD OF MEMORY CONTROLLER

(71) Applicant: SAMSUNG ELECTRONICS CO., LTD., Suwon-si (KR)

(72) Inventors: Wi Jik Lee, Suwon-si (KR); Dong-Min Shin, Seoul (KR); Young Jun Hwang, Hwaseong-si (KR); Hong Rak Son, Anyang-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 186 days.

This patent is subject to a terminal disclaimer.

(21) Appl. No.: 18/310,978

(22) Filed: May 2, 2023

(65) Prior Publication Data

US 2023/0266916 A1     Aug. 24, 2023

Related U.S. Application Data

(63) Continuation of application No. 17/237,136, filed on Apr. 22, 2021, now Pat. No. 11,675,530.

(30) Foreign Application Priority Data

Sep. 11, 2020    (KR) .................... 10-2020-0116586

(51) Int. Cl.
    *G06F 3/06*          (2006.01)

(52) U.S. Cl.
    CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 5,657,332 | A | 8/1997 | Auclair et al. |
| 8,627,175 | B2 | 1/2014 | Patapoutian et al. |
| 8,958,243 | B2 | 2/2015 | Zeng et al. |
| 9,483,347 | B2 | 11/2016 | Wu et al. |

(Continued)

FOREIGN PATENT DOCUMENTS

| | | |
|---|---|---|
| KR | 10-2009-0097673 | 9/2009 |
| KR | 10-2013-0102397 | 9/2013 |

(Continued)

OTHER PUBLICATIONS

European Search Report dated Jan. 24, 2022 in corresponding EP Application No. 21 187 941.6.

(Continued)

*Primary Examiner* — Mark D Featherstone
*Assistant Examiner* — Matthew W Wahlin
(74) *Attorney, Agent, or Firm* — MORGAN, LEWIS & BOCKIUS LLP

(57) ABSTRACT

Provided is an operating method of a memory controller which comprises receiving first decision data of M bits from a memory device, where M is a natural number; converting the M-bit first decision data into second decision data of N bits, where N is a natural number less than M; and attempting a first decoding using the second decision data.

14 Claims, 11 Drawing Sheets

(56) References Cited

U.S. PATENT DOCUMENTS

| | | | |
|---|---|---|---|
| 2012/0134207 A1* | 5/2012 | Yoon | G11C 11/5642 |
| | | | 365/185.09 |
| 2014/0063945 A1 | 3/2014 | Park et al. | |
| 2019/0378576 A1 | 12/2019 | Chen et al. | |
| 2022/0083259 A1 | 3/2022 | Lee et al. | |

FOREIGN PATENT DOCUMENTS

| | | |
|---|---|---|
| KR | 10-1792868 B1 | 11/2017 |
| WO | 2019240847 | 12/2019 |

OTHER PUBLICATIONS

First Office Action dated Feb. 4, 2022 in corresponding EP Application No. 21 187 941.6.
Office Action datd Sep. 30, 2022 in corresponding U.S. Appl. No. 17/237,136.

\* cited by examiner

|  | Strong | Weak | Weak | Strong |
|---|---|---|---|---|
| Mapping (M20) | ①② | ③④ | ⑤⑥ | ⑦⑧ |
| Mapping (M21) | ① | ②③④ | ⑤⑥⑦ | ⑧ |
| Mapping (M22) | ①②③ | ④ | ⑤ | ⑥⑦⑧ |

|  | VW(very weak) | W(weak) | S(strong) | VS(very strong) |
|---|---|---|---|---|
| Mapping (M30) | ①② | ③④ | ⑤⑥ | ⑦⑧ |
| Mapping (M31) | ①② | ③④⑤ | ⑥⑦ | ⑧ |
| Mapping (M32) | ①② | ③④ | ⑤⑥⑦ | ⑧ |
| Mapping (M33) | ① | ②③④ | ⑤⑥ | ⑦⑧ |

MEMORY CONTROLLER, STORAGE DEVICE AND OPERATING METHOD OF MEMORY CONTROLLER

CROSS-REFERENCE TO RELATED APPLICATION

This application is a continuation of U.S. patent application Ser. No. 17/237,136 filed Apr. 22, 2021, which claims priority under 35 U.S.C. § 119 to Korean Patent Application No. 10-2020-0116586 filed on Sep. 11, 2020 in the Korean Intellectual Property Office, the contents of which are herein incorporated by reference.

TECHNICAL FIELD

The present disclosure relates to semiconductor memories, and more particularly relates to a memory controller, a storage device and an operating method of the memory controller.

DISCUSSION OF RELATED ART

In a flash memory device, a memory cell that stores one-bit data in one memory cell is referred to as a single bit cell or a single-level cell (SLC). Further, a memory cell that stores multi-bit data (e.g., 2 bits or more) in one memory cell is referred to as a multi-level cell (MLC). The multi-level cell has an advantage of being a high-capacity storage device, but as the number of bits programmed in one memory cell increases, the read invalidation rate might also increase.

A high bit soft decision read operation may be performed to decrease the read invalidation rate by increasing the correction capability, thereby improving the reliability of data. However, although the reliability of data may be optimized, a computational load for correction rapidly increases and a reading time may also increase.

SUMMARY

Embodiments of the present disclosure provide a memory controller, a storage device, and an operating method of the memory controller, which can sufficiently optimize the reliability of data without rapidly increasing a computational load.

However, embodiments of the present disclosure are not restricted to those set forth herein. The above and other embodiments of the present disclosure will become more apparent to those of ordinary skill in the art to which the present disclosure pertains by referencing the detailed description of the present disclosure.

According to an embodiment of the present disclosure, there is provided an operating method of a memory controller, comprising: receiving first decision data of M bits from a memory device, where M is a natural number; converting the M-bit first decision data into second decision data of N bits, where N is a natural number less than M; and attempting a first decoding using the second decision data.

According to an embodiment of the present disclosure, there is provided an operating method of a memory controller, comprising: receiving first decision data of N bits corresponding to a first area of a memory device, where N is a natural number; invalidating a first decoding using the first decision data; receiving second decision data of M bits corresponding to the first area of the memory device, where M is a natural number greater than N; mapping the M-bit second decision data to N-bit third decision data; invalidating a second decoding using the third decision data; mapping the M-bit second decision data to N-bit fourth decision data different from the third decision data; and performing a third decoding using the fourth decision data.

According to an embodiment of the present disclosure, there is provided a storage device comprising: a memory device configured to provide first decision data of M bits, where M is a natural number; and a memory controller configured to receive the M-bit first decision data, convert the first decision data into second decision data of N bits, where N is a natural number less than M, and attempt a first decoding using the second decision data.

Descriptive details of these and other embodiments are included in the detailed description and drawings.

BRIEF DESCRIPTION OF THE DRAWINGS

The above and other embodiments of the present disclosure will become more apparent by describing in detail exemplary embodiments thereof with reference to the attached drawings, in which.

DETAILED DESCRIPTION

Hereinafter, embodiments of the present disclosure will be described with reference to the accompanying drawings.

Figure 1:
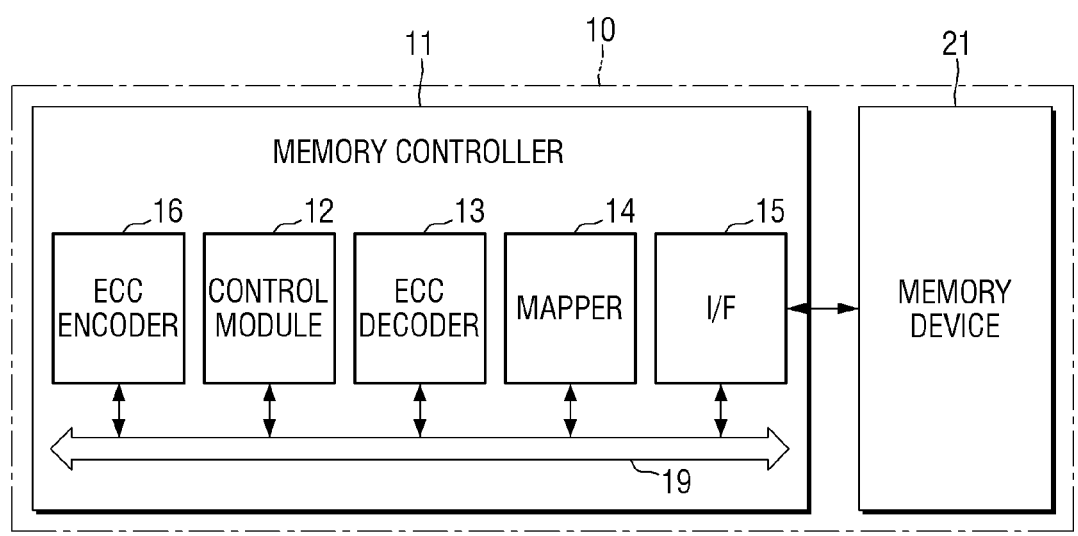
FIG. 1 is a block diagram illustrating a storage device according to an embodiment of the present disclosure.
Figure 2:
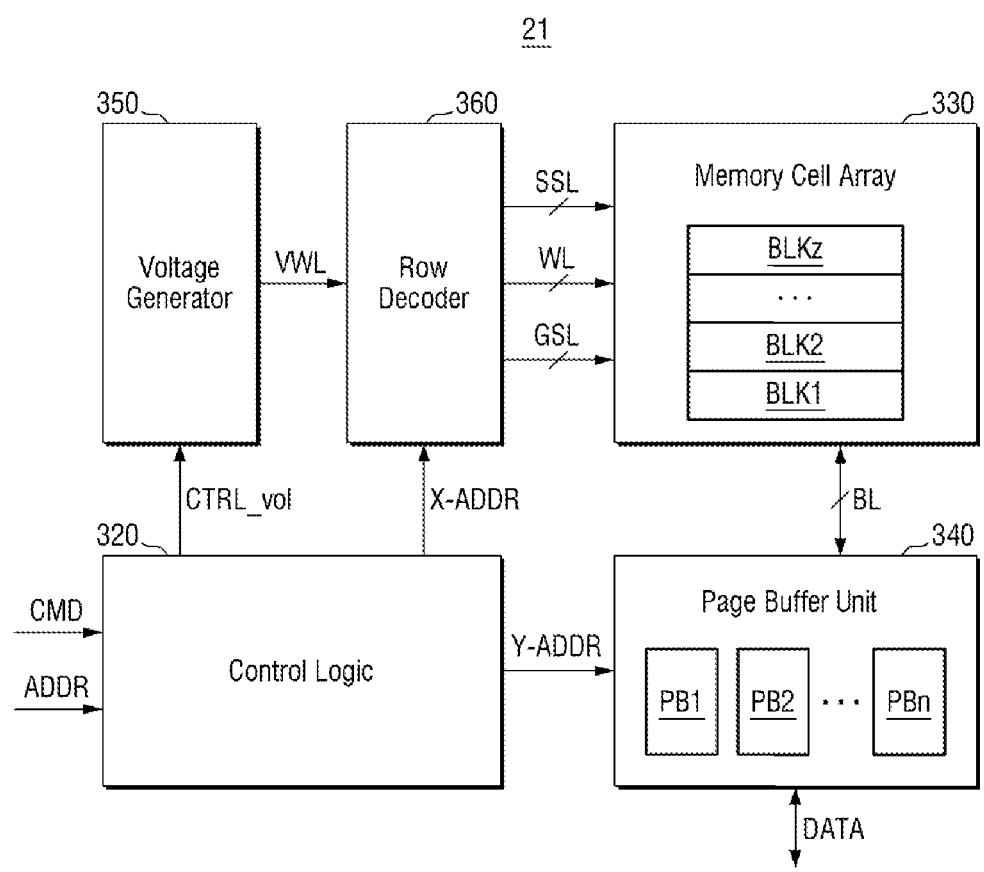
FIG. 2 is a block diagram illustrating a memory device of FIG. 1.

FIG. 1 illustrates a storage device according to an embodiment of the present disclosure. FIG. 2 illustrates a memory device of FIG. 1.

First, referring to FIG. 1, a storage device 10 may communicate with a host and write or read data in response to a request from the host.

The storage device 10 functions as a nonvolatile storage device that stores data regardless of whether or not power is supplied. For example, the storage device 10 includes a memory controller 11, and a memory device 21 that stores data under the control of the memory controller 11.

The memory controller 11 includes a control module 12, an error correcting code (ECC) encoder 16, an ECC decoder 13, a mapper 14, and an interface 15, which are connected to one another through a bus 19. The ECC decoder 13 and the ECC encoder 16 may collectively form an ECC engine or CODEC, but are not limited thereto.

The control module 12 controls the overall operation of the memory controller 11. The control module 12 may analyze a command provided from the host, and according to the analysis result, control the overall operation, such as a program operation, a read operation, an erase operation, an error correction operation, or the like, of the memory device 21.

The control module 12 communicates with the host and the memory device 21 through the interface 15. The interface 15 includes a host interface providing a connection through which data can be exchanged with the host, and a memory interface providing a connection through which data can be exchanged with a memory. The host interface may include various types of interfaces, such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVM express (NVMe), an IEEE 1394, a universal serial bus (USB), a secure digital (SD) card, a multi-media card (MMC), an embedded multi-media card (eMMC), a universal flash storage (UFS), an embedded universal flash storage (eUFS), a compact flash (CF) card, or the like. The memory interface may be implemented to conform to standard conventions such as Toggle or Open NAND Flash Interface (ONFI).

The ECC encoder 16 performs error correction encoding on data strong 1-valued data or input through the host interface, thereby forming data, such as encoded data, to which a parity bit is added. The ECC encoder 16 may include a circuit, logic, code, or a combination thereof for error correction.

The ECC decoder 13 performs error correction using hard decision data and information, such as a soft decision data value, representing the reliability of the hard decision data.

The ECC encoder 16 and the ECC decoder 13 may use coded modulation such as a low-density parity check (LDPC) code, a BCH code, a turbo code, a Reed-Solomon code, a convolution code, a recursive systematic code (RSC), trellis-coded modulation (TCM), or block coded modulation (BCM), but are not limited thereto.

The mapper 14 converts soft decision data of M bits, where M is a natural number equal to or greater than 3, into soft decision data of N bits, where N is a natural number equal to or greater than 2 and less than M. For example, the mapper 14 converts 4-bit soft decision data into 2-bit or 3-bit soft decision data. That is, the mapper 14 lowers the number of bits of the soft decision data. The soft decision data with the number of bits lowered by the mapper 14 is provided to the ECC decoder 13, and the ECC decoder 13 uses it to perform an error correction operation. The error correction operation used in a storage device according to an embodiment of the present disclosure may be described in greater detail with reference to FIGS. 3 to 14.

The memory controller 11 may include a separate memory or buffer memory therein. The buffer memory may serve to temporarily store data provided when a host requests a write. In addition, the buffer memory may also serve as a queue in which tasks related to operations such as program, read, or refresh of the memory device 21 are sequentially stored. In addition, the buffer memory may be a volatile memory such as Static Random-Access Memory (SRAM) and/or Dynamic Random-Access Memory (DRAM), but is not limited thereto.

The memory device 21 may include a V-NAND flash memory having a two-dimensional (2D) structure or a three-dimensional (3D) structure, but is not limited thereto.

Further, the storage device 10 may be physically separated from the host, and may be implemented within the same package as the host.

The storage device 10 of FIG. 1 may be installed and used in various systems. For example, the system may be a mobile system such as a portable communication terminal or mobile telephone, a smart phone, a tablet personal computer, a wearable device, a healthcare device, or an Internet of Things (IoT) device. However, the system is not necessarily limited to a mobile system, and may also be a personal computer, a laptop computer, a server, a media player, an automotive device such as a navigation system, or the like.

Hereinafter, an exemplary structure of the memory device will be described with reference to FIG. 2. FIG. 2 illustrates a memory device 21.

Referring to FIG. 2, the memory device 21 may include a control logic circuit 320, a memory cell array 330, a page buffer unit 340, a voltage generator 350, and a row decoder 360. Although not shown in FIG. 2, the memory device 21 may further include a column logic, a pre-decoder, a temperature sensor, a command decoder, an address decoder, and the like.

The control logic circuit 320 may generally control various operations within the memory device 21. The control logic circuit 320 may output various control signals in response to a command CMD and/or an address ADDR provided from the memory controller 11. For example, the control logic circuit 320 may output a voltage control signal CTRL_vol, a row address X-ADDR, and a column address Y-ADDR.

The memory cell array 330 may include a plurality of memory blocks BLK1 to BLKz, where z is a positive integer, and each of the plurality of memory blocks BLK1 to BLKz may include a plurality of memory cells. The memory cell array 330 may be connected to the page buffer unit 340 through bit lines BL, and may be connected to the row decoder 360 through word lines WL, string select lines SSL, and ground select lines GSL.

In an exemplary embodiment, the memory cell array 330 may include a 3D memory cell array, and the 3D memory cell array may include a plurality of NAND strings. Each NAND string may include memory cells respectively connected to word lines vertically stacked on a substrate. Applicant's U.S. Pat. Nos. 7,679,133, 8,553,466, 8,654,587, 8,559,235, and U.S. Patent Application Publication No. 2011/0233648 are incorporated by reference herein pursuant to 37 CFR § 1.57. Thus, in an exemplary embodiment, the memory cell array 330 may include a 2D memory cell array, and the 2D memory cell array may include a plurality of NAND strings arranged along row and column directions. Duplicate description may be omitted.

The page buffer unit 340 may include a plurality of page buffers PB1 to PBn, where n is an integer equal to or greater than 3, and the plurality of page buffers PB1 to PBn may be respectively connected to the memory cells through the plurality of bit lines BL. The page buffer unit 340 may select at least one of the bit lines BL in response to the column address Y-ADDR. The page buffer unit 340 may operate as a write driver or a sense amplifier depending on an operation mode. For example, during a program operation, the page buffer unit 340 may apply, to the selected bit line, a bit line voltage corresponding to data to be programmed. During a read operation, the page buffer unit 340 may sense data stored in the memory cell by sensing a current or voltage of the selected bit line.

The voltage generator 350 may generate various types of voltages for performing program, read, and erase operations based on the voltage control signal CTRL_vol. For example, the voltage generator 350 may generate a program voltage, a read voltage, a program verification voltage, an erase voltage, and the like as a word line voltage VWL.

The row decoder 360 may select one of the plurality of word lines WL and one of the plurality of string select lines SSL, in response to the row address X-ADDR. For example, during a program operation, the row decoder 360 may apply a program voltage and a program verification voltage to the selected word line, and during a read operation, the row decoder 360 may apply a read voltage to the selected word line.

Meanwhile, in the case of a flash memory device such as a multi-level flash memory device, if program/erase is repeatedly used a predetermined number of times or more, the characteristics of the flash memory cell may be deteriorated. Specifically, charge loss may occur in which electrons trapped in a floating gate or tunnel oxide are released over time. In addition, the charge loss may further increase as the tunnel oxide is deteriorated while the program and erase are repeated. The charge loss may reduce a threshold voltage, and thus, for example, a threshold voltage distribution may be shifted. Alternatively, program disturbance, erase disturbance, and/or back pattern dependency may increase the threshold voltage distribution. Accordingly, due to the deterioration of the characteristics of the flash memory cell by the above-described or like reason, threshold voltage distributions adjacent to each other may overlap each other. In this way, when the threshold voltage distributions overlap each other, errors may be included in read data. Hereinafter, a soft decision read and error correction operation for reducing such errors will be described.

Figure 3:
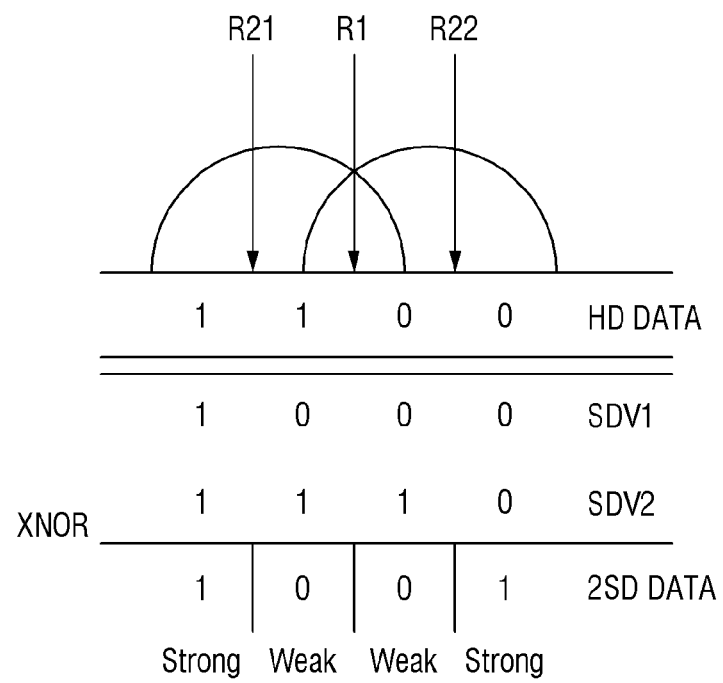
FIG. 3 is a hybrid diagram explaining a 2-bit soft decision read operation.

FIG. 3 illustrates a 2-bit soft decision read operation.

Referring to FIG. 3, "decision data" as used herein includes "hard decision data" by a hard decision read operation and "soft decision data" by a soft decision read operation.

Specifically, the hard decision read operation refers to a normal data read operation, and includes reading data stored in the memory cell as 1 or 0 depending on the on or off state of the memory cell, when a read voltage is supplied to the word line of the memory cell. A hard decision read voltage is indicated as R1. When R1 is applied to the memory cell, hard decision data HDDATA becomes 1 if the memory cell is in the on state, and the hard decision data HDDATA becomes 0 if the memory cell is in the off state.

The soft decision read operation refers to forming information that adds reliability to hard decision read data, by applying, to the memory cell, a plurality of read voltages (e.g., soft decision read voltages) having a predetermined voltage difference based on the hard decision read voltage R1.

As illustrated in FIG. 3, the soft decision read voltages (or offset voltages) used in the 2-bit soft decision read operation (or 2-level soft decision read operation) are indicated as R21 and R22. When the read voltage R21 is applied to the memory cell, data SDV1 determined according to the on or off state of the memory cell may be 1, 0, 0, and 0. When the read voltage R22 is applied to the memory cell, data SDV2 determined according to the on or off state of the memory cell become 1, 1, 1, and 0.

An exclusive NOR (XNOR) operation is performed on the read values SDV1 and SDV2 obtained by two soft decision read operations, thereby forming 2-bit soft decision data 2SDDATA. As shown, the 2-bit soft decision data 2SDDATA becomes 1, 0, 0 and 1. The soft decision data 2SDDATA may add reliability to the hard decision data HDDATA. In other words, if the 2-bit soft decision data 2SDDATA is 1, it may mean that the hard decision data is strong, and if the 2-bit soft decision data 2SDDATA is 0, it may mean that the hard decision data is weak.

When the "2-bit" soft decision read has been applied, the number of "decision data" may be 4 ($=2^2$). That is, output decision data becomes 11, 10, 00, 01. For example, if the decision data is "11", the hard decision data is 1 and the soft decision data is 1. Therefore, "11" means the hard decision data of 1 having high reliability. Alternatively, if the decision data is "00", the hard decision data is 0 and the soft decision data is 0. Therefore, "00" means the hard decision data of 0 having low reliability. Similarly, "01" means the hard decision data of 0 having high reliability; and "10" means the hard decision data of 1 having low reliability.

Figure 4:
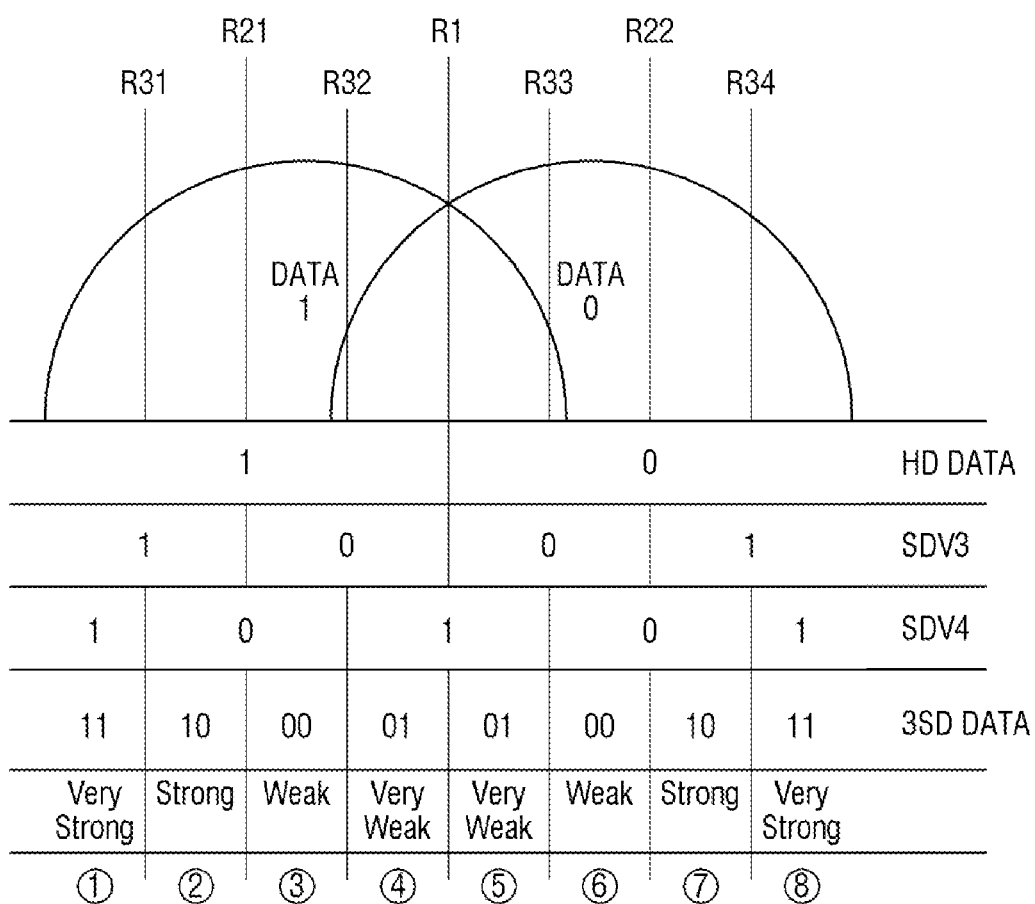
FIG. 4 is a hybrid diagram explaining a 3-bit soft decision read operation.

FIG. 4 illustrates a 3-bit soft decision read operation.

Referring to FIG. 4, the hard decision data HDDATA becomes 1 or 0 depending on whether the memory cell is in the on state or off state based on the hard decision read voltage R1.

The soft decision read voltages (or offset voltages) used in the 3-bit soft decision read operation (or 3-level soft decision read operation) are indicated as R21, R22, R31, R32, R33, and R34. Specifically, the soft decision read voltages R21 and R22 may have a predetermined voltage difference based on the hard decision read voltage R1, the soft decision read voltages R31 and R32 may have a predetermined voltage difference based on the soft decision read voltage R21, and the soft decision read voltages R33 and R34 may have a predetermined voltage difference based on the soft decision read voltage R22.

Similar to the above in FIG. 3, data SDV3 of FIG. 4 becomes 1, 0, 0 and 1 by an XNOR operation of read values determined using R21 and R22.

In addition, data SDV4 of FIG. 4 becomes 1, 0, 1, 0 and 1 by XNOR operation of read values determined using R31, R32, R33, and R34.

As a result, 3-bit soft decision data 3SDDATA based on the data SDV3 and SDV4 becomes 11, 10, 00, 01, 01, 00, 10 and 11. Here, "11" means very strong, "10" means strong, "00" means weak, and "01" means very weak.

Since the "3-bit" soft decision read has been applied, the number of "decision data" may be 8 ($=2^3$). That is, the decision data is outputted as 111, 110, 100, 101, 001, 000, 010, and 011. For example, if the decision data is "111", the hard decision data is 1 and the soft decision data is 11. Therefore, "111" means the hard decision data of 1 having very high reliability. Alternatively, if the decision data is "001", the hard decision data is 0 and the soft decision data is 01. Therefore, "001" means the hard decision data of 0 having very low reliability.

In an operating method of a memory controller according to an embodiment of the present disclosure, the memory controller 11 receives 3-bit decision data (e.g., hard decision data and 3-bit soft decision data) from the memory device 21 and converts it into 2-bit decision data to perform a decoding operation. This conversion operation will be described with reference to FIGS. 5 to 7.

Figure 5:
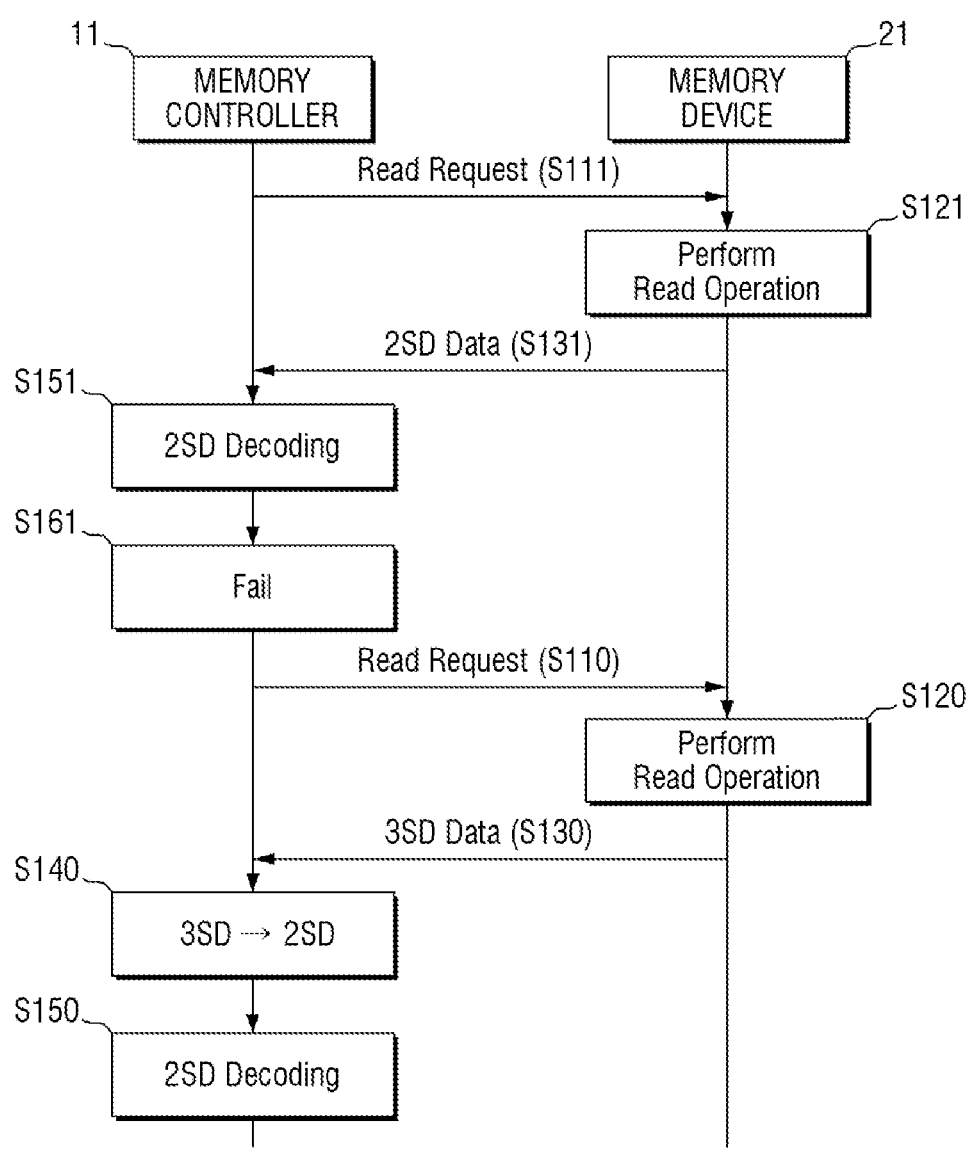
FIG. 5 is a ladder diagram explaining an operating method of a memory controller according to an embodiment of the present disclosure.
Figures 6, 7:
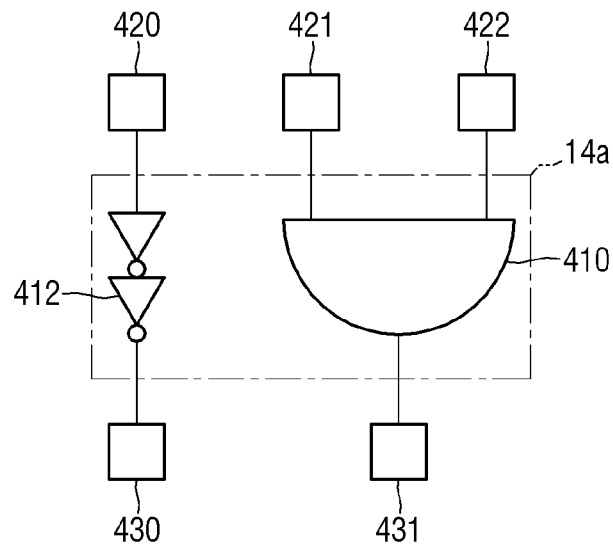
FIG. 6 is a tabular diagram describing a mapping operation described with reference to FIG. 5.
FIG. 7 is a block diagram of a mapper.

FIG. 5 illustrates an operating method of a memory controller according to an embodiment of the present disclosure. FIG. 6 illustrates a mapping operation described with reference to FIG. 5. FIG. 7 illustrates a mapper (see reference numeral 14 in FIG. 1).

Referring to FIG. 5, the memory controller 11 makes a read request to the memory device 21 (step S111). In response to the read request, the memory device 21 performs a read operation (step S121). Subsequently, the memory device 21 provides 2-bit decision data (e.g., hard decision data and 2-bit soft decision data) to the memory controller 11 (step S131).

Specifically, the memory controller 11 may make a request for hard decision read and a request for 2-bit soft decision read separately to the memory device 21, and accordingly, the memory device 21 may separately perform the hard decision read and the 2-bit soft decision read, and separately provide the hard decision data and the 2-bit soft decision data to the memory controller 11.

Alternatively, the memory controller 11 may make a read request to the memory device 21, and accordingly, the memory device 21 may sequentially perform the hard decision read and the 2-bit soft decision read, and provide both the hard decision data and the 2-bit soft decision data to the memory controller 11.

Subsequently, the memory controller 11 performs an ECC decoding operation based on the 2-bit decision data (step S151). The memory controller 11 may determine that the returned 2-bit decision data invalidates the decoding operation (step S161).

The memory controller 11 makes another read request to the memory device 21 (step S110). Then, in response to the read request, the memory device 21 performs a read operation (step S120). Subsequently, the memory device 21 provides 3-bit decision data (e.g., hard decision data and 3-bit soft decision data) to the memory controller 11 (step S130).

Specifically, the read request in step S111 and the read request in step S110 are requests to read data stored in the same area (e.g., an area corresponding to the same address). This is because the 2-bit decision data obtained through the read request in step S111 could not be conclusively decoded.

In addition, as described above, the memory controller 11 may separately make a request for a hard decision read and a request for a 3-bit soft decision read to the memory device 21. Accordingly, the memory device 21 may separately perform the hard decision read and the 3-bit soft decision read, and separately provide the hard decision data and the 3-bit soft decision data to the memory controller 11.

Alternatively, the memory controller 11 may make a read request to the memory device 21, and accordingly, the memory device 21 may sequentially perform the hard decision read and the 3-bit soft decision read, and provide both the hard decision data and the 3-bit soft decision data to the memory controller 11. In one embodiment, the hard decision data, the 2-bit soft decision data, and the 3-bit soft decision data may each be read in one but not both of the read operations S121 or S120. In another embodiment, the hard decision data and/or the 2-bit soft decision data may be read in each of the read operations S121 and S120.

Subsequently, the memory controller 11 converts the 3-bit decision data into mapped 2-bit decision data (step S140). For example, the mapper 14 (see FIG. 1) maps the 3-bit decision data to the mapped 2-bit decision data.

Here, referring to FIG. 6, ①, ②, ③, ④, ⑤, ⑥, ⑦ and ⑧ indicate 11, 10, 00, 01, 01, 00, 10 and 11 of the 3-bit soft decision data 3SDDATA, respectively (see FIG. 4). Strong, Weak, Weak, and Strong are represented as 1, 0, 0, and 1 of the 2-bit soft decision data 2SDDATA, respectively (see FIG. 3).

Referring to mapping M20 (e.g., the first row), it can be seen that ① and ② correspond to Strong(1), ③ and ④ correspond to Weak(0), ⑤ and ⑥ correspond to Weak(0), and ⑦ and ⑧ correspond to Strong(1). Comparing FIG. 3 to FIG. 4, it can be seen that the 2-bit soft decision data and the 3-bit soft decision data correspond to each other as in the mapping M20.

In the operating method of the memory controller according to this embodiment of the present disclosure, mapping may be performed in the same manner as mapping M21 or mapping M22 instead of the mapping M20. This is because even though 3-bit decision data is provided, if mapping is performed in the same manner as the mapping M20, there may be no significant difference from the case where 2-bit decision data is provided and decoded (see steps S131, S151, and S161).

Referring to the mapping M21 (e.g., the second row), ① is mapped to Strong(1), ②, ③, and ④ to Weak(0), ⑤, ⑥, and ⑦ to Weak(0), and ⑧ to Strong(1). For example, if the 3-bit soft decision data provided from the memory device 21 is 10 (e.g., ②), "10" may be mapped to "0" (Weak) by the mapper 14 (see FIG. 1).

Referring to the mapping M22 (e.g., the third row), ①, ②, and ③ are mapped to Strong(1), ④ to Weak(0), ⑤ to Weak(0), and ⑥, ⑦, and ⑧ to Strong(1). For example, if the 3-bit soft decision data provided from the memory device 21 is 00 (e.g., ③), "00" may be mapped to "1" (Strong) by the mapper 14 (see FIG. 1).

Of the mappings M20, M21 and M22; M21 may be preferred as the 3-bit to 2-bit mapping for a new read of hard, 2-bit and 3-bit decision data following a weak or indeterminate 2-bit result; while M22 may be preferred as the 3-bit to 2-bit mapping for an incremental read of only 3-bit decision data following a weak or indeterminate 2-bit result. Moreover, the mapper 14 (see FIG. 1) may perform mapping in yet a different manner from the above-described mappings M20, M21 or M22. For example, an alternate incremental read embodiment might use R1 to obtain hard decision data; R21 and R22 to obtain 2-bit soft decision data; and R32 and R33 to obtain 3-bit soft decision data, but omit R31 and R34.

Referring back to FIG. 5, an ECC decoding operation is attempted based on the 2-bit decision data mapped in step S140 (step S150).

According to the operating method of the memory controller according to this embodiment of the present disclosure, where the 3-bit decision data has been used, reliability may be sufficiently optimized, and since the ECC decoding may be conditionally performed based on the 2-bit decision data, the computational load need not be rapidly increased. In addition, where the 3-bit decision data is provided only when the ECC decoding based on the 2-bit decision data invalidates, the decoding process may be highly efficient.

An exemplary circuit diagram of a mapper for mapping in conformity with the mapping M21 will be described with reference to FIG. 7.

Referring to FIG. 7, a mapper 14a includes input terminals 420, 421 and 422 and output terminals 430 and 431. The hard decision data is input to a first input terminal 420, and the 3-bit soft decision data is input to second and third input terminals 421 and 422.

The hard decision data input through the first input terminal 420 is provided to a first output terminal 430 through a delay unit 412. The 3-bit soft decision data input through the second and third input terminals 421 and 422 is processed through an AND operator 410 and provided to a second output terminal 431. For example, when "1", "1", and "0" are input to the first to third input terminals 420, 421, 422 of the mapper 14a, respectively, "1" is outputted to the first output terminal 430 and "0" is outputted to the second output terminal 431. That is, "110" which is 3-bit decision data is mapped to "10" which is 2-bit decision data.

Figure 8:
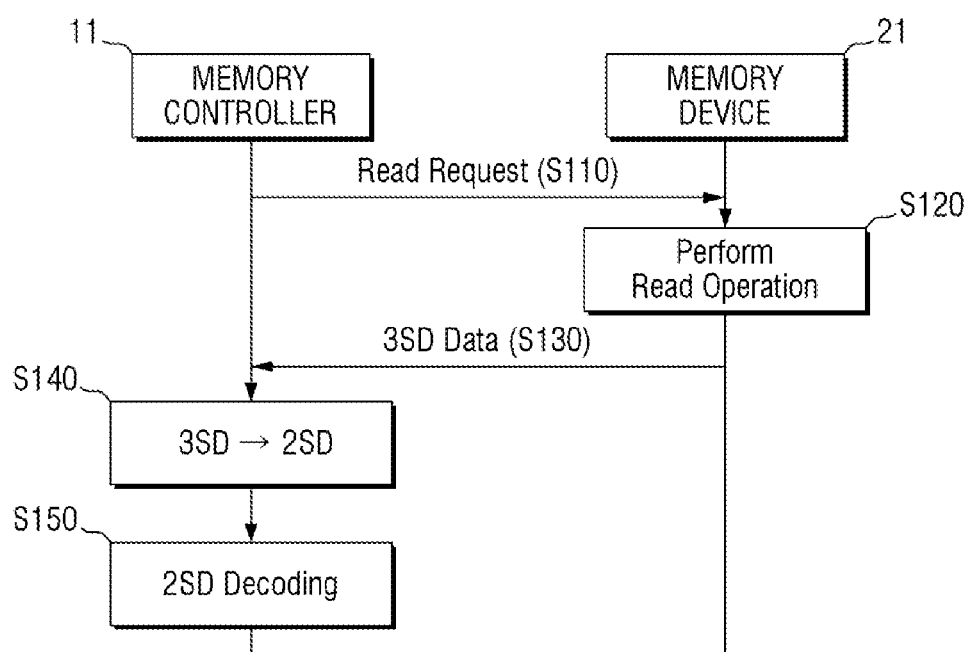
FIG. 8 is a ladder diagram explaining an operating method of a memory controller according to an embodiment of the present disclosure.

FIG. 8 illustrates an operating method of a memory controller according to an embodiment of the present disclosure. For simplicity of description, the following description will focus on differences from the description with reference to FIG. 5, and duplicate description may be omitted.

In FIG. 5, after the ECC decoding invalidates using the 2-bit decision data, the 3-bit decision data is provided. In FIG. 8, there is no separate step of performing the ECC decoding using 2-bit decision data.

Specifically, the memory controller 11 makes a read request to the memory device 21 (step S110). Then, in response to the read request, the memory device 21 performs a read operation (step S120). Subsequently, the memory device 21 provides 3-bit decision data (e.g., hard decision data and 3-bit soft decision data) to the memory controller 11 (step S130).

Thereafter, the memory controller 11 converts the 3-bit decision data into 2-bit decision data (step S140). For example, the mapper 14 (see FIG. 1) maps the 3-bit decision data to the mapped 2-bit decision data. As described with reference to FIG. 6, using the mapping M21, ① may be mapped to Strong(1) 1-valued hard data, ②, ③, and ④ to Weak(0) 1-valued hard data, ⑤, ⑥, and ⑦ to Weak(0) 0-valued hard data, and ⑧ to Strong(1) 0-valued hard data. Alternatively, by using the mapping M22, ①, ②, and ③ may be mapped to Strong(1), ④ to Weak(0), ⑤ to Weak(0), and ⑥, ⑦, and ⑧ to Strong(1).

Subsequently, an ECC decoding operation is attempted based on the 2-bit decision data (step S150).

Figure 9:
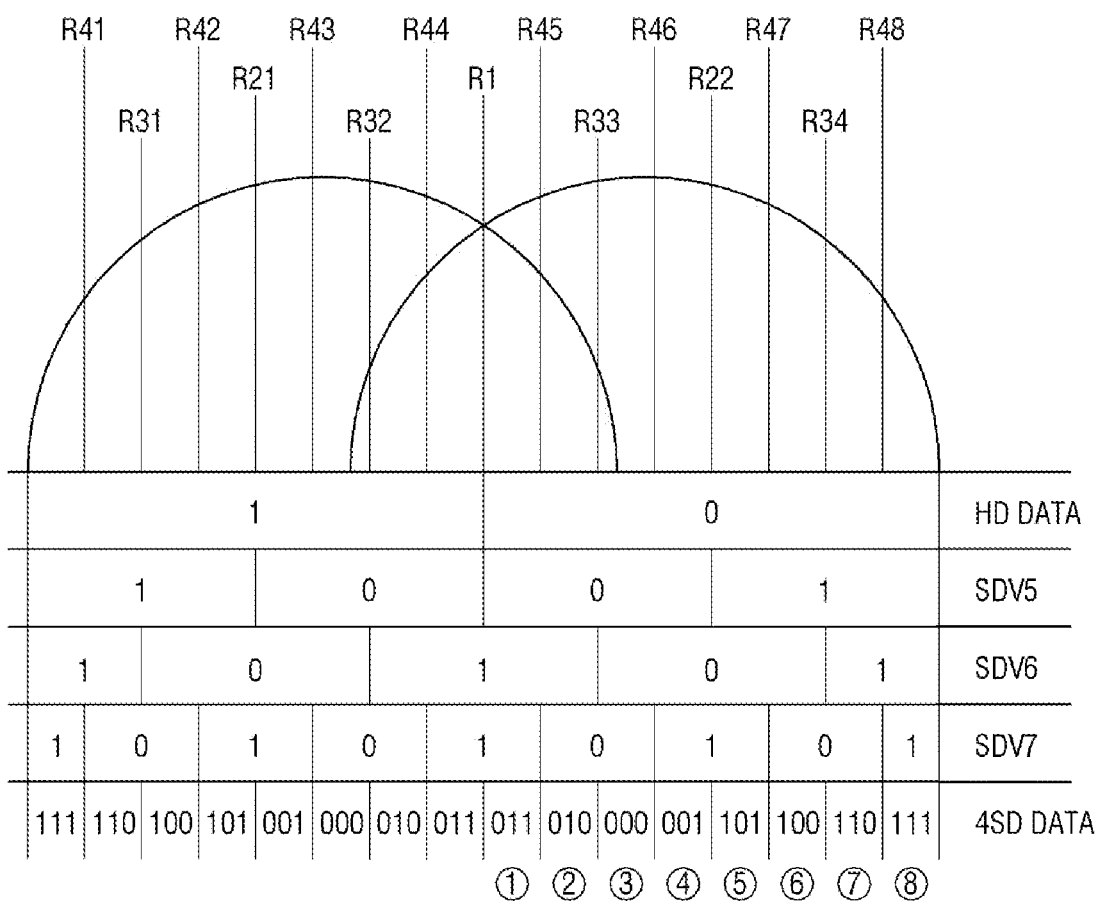
FIG. 9 is a hybrid diagram explaining a 4-bit soft decision read operation.

FIG. 9 illustrates a 4-bit soft decision read operation.

Referring to FIG. 9, the hard decision data HDDATA becomes 1 or 0 depending on whether the memory cell is in the on state or off state based on the hard decision read voltage R1.

The soft decision read voltages (or offset voltages) used in the 4-bit soft decision read operation (or 4-level soft decision read operation) are indicated as R21, R22, R31, R32, R33, R34, R41, R42, R43, R44, R45, R46, R47, and R48. Specifically, the soft decision read voltages R21 and R22 having a predetermined voltage difference based on the hard decision read voltage R1, the soft decision read voltages R31 and R32 having a predetermined voltage difference based on R21, and the soft decision read voltages R33 and R34 having a predetermined voltage difference based on R22 are used. In addition, the soft decision read voltages R41 and R42 having a predetermined voltage difference based on R31, the soft decision read voltages R43 and R44 having a predetermined voltage difference based on R32, and the soft decision read voltages R45 and R46 having a predetermined voltage difference based on R33, and the soft decision read voltages R47 and R48 having a predetermined voltage difference based on R34 are included.

Similarly, data SDV5 becomes 1, 0, 0 and 1 by XNOR operation of read values determined using R21 and R22. In addition, data SDV6 becomes 1, 0, 1, 0, and 1 by XNOR operation of read values determined using R31, R32, R33, and R34. Data SDV7 becomes 1, 0, 1, 0, 1, 0, 1, 0 and 1 by XNOR operation of read values determined using R41, R42, R43, R44, R45, R46, R47, and R48.

As a result, 4-bit soft decision data 4SDDATA based on the data SDV5, SDV6 and SDV7 becomes 111, 110, 100, 101, 001, 000, 010, 011, 011, 010, 000, 001, 101, 100, 110, and 111.

Since the "4-bit" soft decision read has been applied, the number of "decision data" may be 16 ($=2^4$). That is, the decision data is outputted as 1111, 1110, 1100, 1101, 1001, 1000, 1010, 1011, 0011, 0010, 0000, 0001, 0101, 0100, 0110 and 0111. For example, if the decision data is "1111", the hard decision data is 1 and the soft decision data is 111. Therefore, "1111" means the hard decision data of 1 having the highest reliability.

Meanwhile, in an operating method of a memory controller according to an embodiment of the present disclosure, the memory controller 11 receives 4-bit decision data (e.g., hard decision data and 4-bit soft decision data) from the memory device 21 and converts it into 3-bit decision data to perform a decoding operation. This conversion operation will be described with reference to FIGS. 10 to 13.

Figure 10:
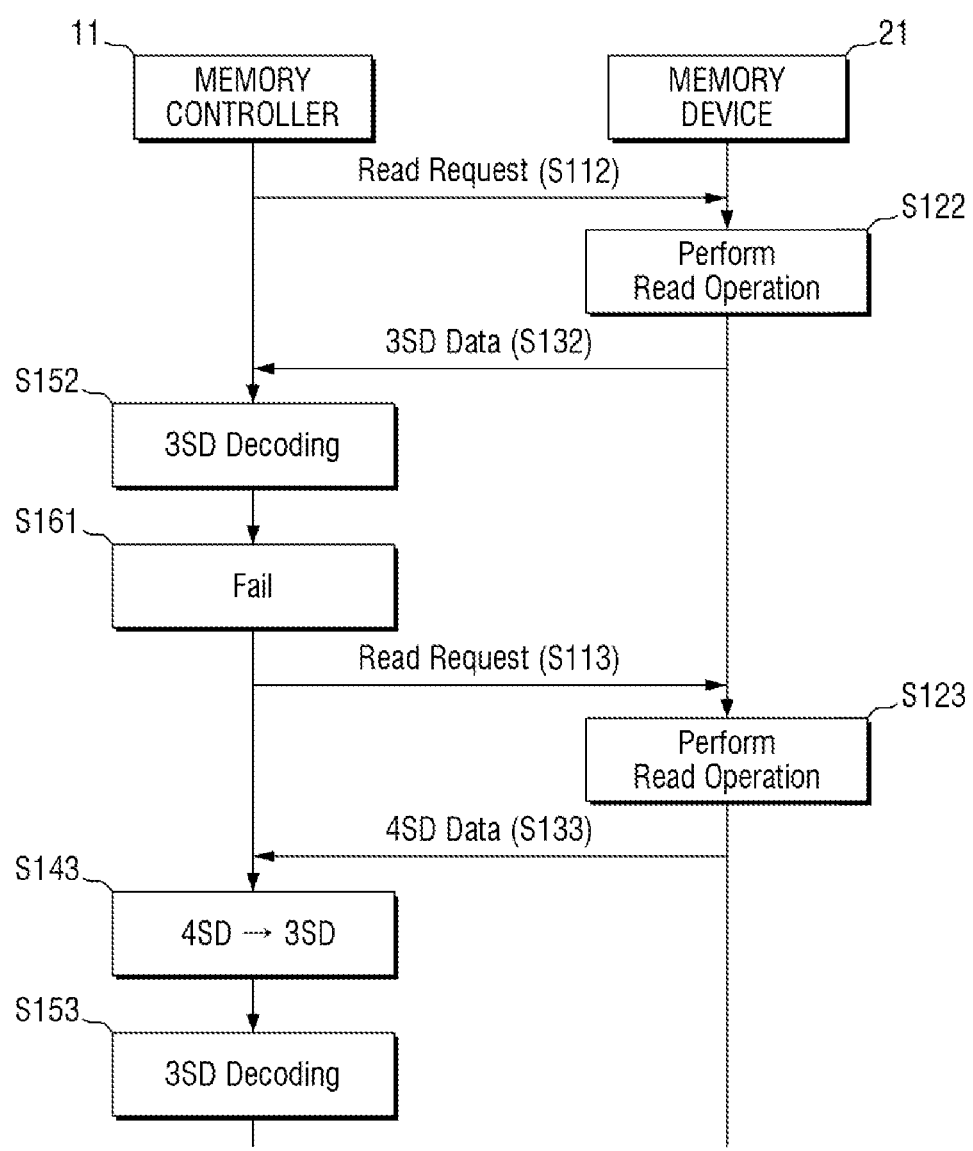
FIG. 10 is a ladder diagram illustrating an operating method of a memory controller according to an embodiment of the present disclosure.
Figures 11, 12:
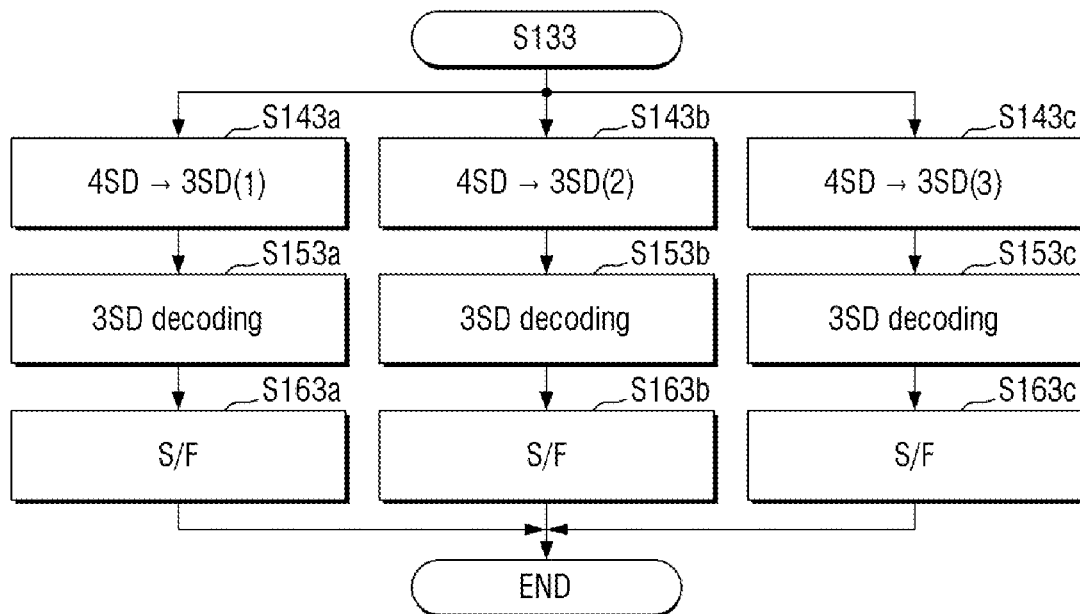
FIG. 11 is a tabular diagram describing a mapping operation described in FIG. 10.
FIG. 12 is a flowchart diagram illustrating an operating method of a memory controller according to an embodiment of the present disclosure.

FIG. 10 illustrates an operating method of a memory controller according to an embodiment of the present disclosure. FIG. 11 illustrates a mapping operation described in FIG. 10. For simplicity of description, substantially the same description as described with reference to FIGS. 5 to 9 will be omitted.

Referring to FIG. 10, the memory controller 11 makes a read request to the memory device 21 (step S112). Then, in response to the read request, the memory device 21 performs a read operation (step S122). Subsequently, the memory device 21 provides 3-bit decision data (e.g., hard decision data and 3-bit soft decision data) to the memory controller 11 (step S132). Thereafter, the memory controller 11 performs an ECC decoding operation based on the 3-bit decision data (step S152). The memory controller 11 may determine that the returned 3-bit decision data invalidates the decoding operation (step S162).

The memory controller 11 makes another read request to the memory device 21 (step S113). Then, in response to the read request, the memory device 21 performs a read operation (step S123).

Subsequently, the memory device 21 provides 4-bit decision data (e.g., hard decision data and 4-bit soft decision data) to the memory controller 11 (step S133). Specifically, the read request in step S112 and the read request in step S113 are requests to read data stored in the same area (e.g., an area corresponding to the same address). This is because the 3-bit decision data obtained through the read request in step S112 could not be conclusively decoded.

Subsequently, the memory controller 11 converts the 4-bit decision data into 3-bit decision data (step S143). For example, the mapper 14 (see FIG. 1) maps the 4-bit decision data to the 3-bit decision data.

Here, referring to FIG. 11, ①, ②, ③, ④, ⑤, ⑥, ⑦, and ⑧ indicate 011, 010, 000, 001, 101, 100, 110 and 111 of the 4-bit soft decision data 4SDDATA, respectively (see FIG. 9). VW (Very Weak), W (Weak), S (Strong), VS (Very Strong) are represented as 01, 00, 10, 11 of the 3-bit soft decision data 3SDDATA (see FIG. 4).

Referring to mapping M30 (e.g., the first row), for the 0-valued hard data, it can be seen that ① and ② correspond to very weak soft decision data VW(01), ③ and ④ correspond to weak soft decision data W(00), ⑤ and ⑥ correspond to strong soft decision data S(10), and ⑦ and ⑧ correspond to very strong soft decision data VS(11). It shall be understood that the indicia ①, ②, ③, ④, ⑤, ⑥, ⑦ and ⑧ indicate different values in FIG. 9 and FIG. 11 than in FIG. 4 and FIG. 6. Comparing FIG. 4 to FIG. 9, it can be seen that the 3-bit soft decision data 3SDDATA and the 4-bit soft decision data 4SDDATA may correspond to each other in the mapping M30, but not in the mappings M31, M32 or M33.

In an operating method of the memory controller according to this embodiment of the present disclosure, mapping may be performed in substantially the same manner as mapping M31, mapping M32, or mapping M33 instead of the mapping M30. This is because even though 4-bit decision data is provided, if mapping is performed in the same manner as the mapping M30, there may be no significant difference from the case where 3-bit decision data is provided and decoded (see steps S132, S152, and S162).

Referring to the mapping M31 (e.g., the second row), ① and ② are mapped to VW(01), ③, ④, and ⑤ to W(00), ⑥ and ⑦ to S(10), and ⑧ to VS(11). For example, if the 4-bit soft decision data provided from the memory device 21 is 101 (e.g., ⑤), "101" may be mapped to "00" (Weak) by the mapper 14 (see FIG. 1).

Referring to the mapping M32 (e.g., the third row), ① and ② are mapped to VW(01), ③ and ④ to W(00), ⑤, ⑥, and ⑦ to S(10), and ⑧ to VS(11). For example, if the 3-bit soft decision data provided from the memory device 21 is 110 (e.g., ⑦), "110" may be mapped to "10" (Strong) by the mapper 14 (see FIG. 1).

Referring to the mapping M33 (e.g., the fourth row), ① is mapped to VW(01), ②, ③, and ④ to W(00), ⑤ and ⑥ to S(10), and ⑦ and ⑧ to VS(11). For example, if the 3-bit soft decision data provided from the memory device 21 is 001 (e.g., ④), "001" may be mapped to "00" (Weak) by the mapper 14 (see FIG. 1).

Referring back to FIG. 10, an ECC decoding operation is attempted based on the 3-bit decision data (step S153).

According to the operating method of the memory controller according to this embodiment of the present disclosure, since the 4-bit decision data has been used, reliability may be sufficiently optimized, and since the ECC decoding may be performed based on the 3-bit decision data, the computational load need not be rapidly increased. In addition, since the 4-bit decision data may be provided only when the ECC decoding based on the 3-bit decision data invalidates, the decoding process may be highly efficient.

In summary, the memory controller 11 receives first decision data of N bits, where N is a natural number equal to or greater than 2, corresponding to a predetermined area of the memory device, and invalidates a first decoding that uses the first decision data.

If the first decoding invalidates, second decision data of M bits, where M is a natural number greater than N, corresponding to the predetermined area of the memory device is provided. A method of providing the second decision data may be varied. For example, if the first decision data is 3 bits, the second decision data may be 4 bits, without limitation thereto. Alternatively, the second decision data may be made by receiving 3-bit decision data twice (e.g., the second decision data is 6 bits). In this case, an offset voltage corresponding to the first 3-bit decision data and an offset voltage corresponding to the second 3-bit decision data may be different from each other, allowing for comparison.

Subsequently, the M-bit second decision data may be mapped to N-bit third decision data. Mapping may be performed in the manner described with reference to FIG. 6 or FIG. 11. Alternatively, when the second decision data is made by receiving the 3-bit decision data twice, the first 3-bit decision data and the second 3-bit decision data may be logically operated to generate the third decision data.

Subsequently, a second decoding may be performed using the third decision data made by mapping. If the second decoding succeeds, the read process may be successfully terminated.

If the second decoding invalidates, the M-bit second decision data is mapped to N-bit fourth decision data different from the third decision data, and a third decoding may be additionally performed using the fourth decision data. The additional decoding operation may be described in greater detail with reference to FIGS. 12 and 13.

FIG. 12 illustrates an operating method of a memory controller according to an embodiment of the present disclosure. Substantially the same description as described with reference to FIG. 10 is applicable, so duplicate description may be omitted.

Referring to FIG. 12, the memory controller 11 receives 4-bit decision data (e.g., hard decision data and 4-bit soft decision data) from the memory device 21 (step S133).

Subsequently, the 4-bit decision data is converted into a plurality of 3-bit decision data (steps S143a, S143b, and S143c). For example, in step S143a, mapping may be performed, for example, as in the mapping M31; in step S143b, mapping may be performed, for example, as in the mapping M32; and in step S143c, mapping may be performed, for example, as in the mapping M33.

Subsequently, an ECC decoding operation is attempted based on the converted plurality of 3-bit decision data (steps S153a, S153b, and S153c).

Thereafter, the operating method determines whether each of a plurality of ECC decoding operations succeed or invalidate (steps S163a, S163b, and S163c). The step sequences (S143a, S153a, S163a), (S143b, S153b, S163b) and/or (S143c, S153c, S163c) may be performed in parallel, without limitation thereto.

In the operating method of the memory controller according to this embodiment of the present disclosure, since the ECC decoding operation is performed using the plurality of 3-bit decision data, reliability may be further optimized.

In addition, since one 4-bit decision data is received and converted into a plurality of 3-bit decision data, the 4-bit decision data is not unnecessarily provided from the memory device 21 multiple times. Therefore, it is possible to reduce unnecessary load in read and decoding operations.

In addition, in the operating method of the memory controller according to this embodiment of the present disclosure, three 3-bit decision data has been generated by three mapping methods M31, M32, and M33, but the present disclosure is not limited thereto. That is, the 3-bit decision data may be generated by using two mapping methods or four or more mapping methods.

Figure 13:
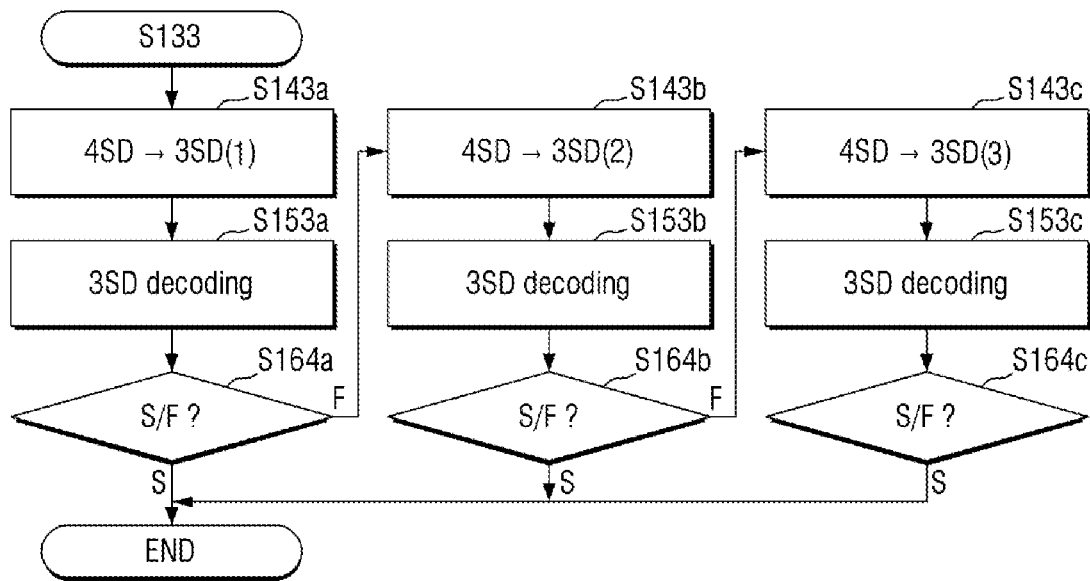
FIG. 13 is a flowchart diagram illustrating an operating method of a memory controller according to an embodiment of the present disclosure.

FIG. 13 illustrates an operating method of a memory controller according to an embodiment of the present disclosure. Substantially the same description as described with reference to FIGS. 10 and 12 is applicable, so duplicate description may be omitted.

Referring to FIG. 13, the memory controller 11 receives 4-bit decision data (e.g., hard decision data and 4-bit soft decision data) from the memory device 21 (step S133).

Then, the 4-bit decision data is mapped as in the mapping M31 and converted into 3-bit decision data (step S143a). Subsequently, an ECC decoding operation is attempted based on the converted 3-bit decision data (step S153a). Thereafter, it is checked whether the ECC decoding operation succeeds or invalidates (step S164a).

If the ECC decoding operation succeeds (S) in step S164a, the process is terminated without proceeding with a subsequent process.

If the ECC decoding operation invalidates (F) in step S164a, the 4-bit decision data is remapped as in the mapping M32 and converted into 3-bit decision data (step S143b). Subsequently, an ECC decoding operation is attempted based on the converted 3-bit decision data (step S153b). Thereafter, it is checked whether the ECC decoding operation succeeds or invalidates (step S164b).

If the ECC decoding operation succeeds (S) in step S164b, the process is terminated without proceeding with a subsequent process.

If the ECC decoding operation invalidates (F) in step S164b, the 4-bit decision data is remapped as in the mapping M33 and converted into 3-bit decision data (step S143c). Subsequently, an ECC decoding operation is attempted based on the converted 3-bit decision data (step S153c). Subsequently, it is checked whether the ECC decoding operation succeeds or invalidates (step S164c).

If the ECC decoding operation succeeds (S) in step S164c, the process is terminated without proceeding with a subsequent process.

In the operating method of the memory controller according to this embodiment of the present disclosure, only when the ECC decoding operation invalidates (e.g., step S164a), new 3-bit decision data is generated (e.g., step S143b) and another ECC decoding operation is performed (e.g., step S153b). Accordingly, it is possible to reduce unnecessary decoding operations.

Further, since a plurality of ECC decoding operations may be performed using the plurality of 3-bit decision data, reliability may be further optimized.

In addition, since one 4-bit decision data is received and converted into a plurality of 3-bit decision data, the 4-bit decision data is not unnecessarily provided from the memory device 21 multiple times. Therefore, it is possible to reduce unnecessary load in read and decoding operations.

Furthermore, in the operating method of the memory controller according to this embodiment of the present disclosure, it has been described that the decoding operation is performed three consecutive times (e.g., steps S153a, S153b, and S153c), but the present disclosure is not limited thereto. That is, two consecutive decoding operations or four consecutive decoding operations may be performed.

Figure 14:
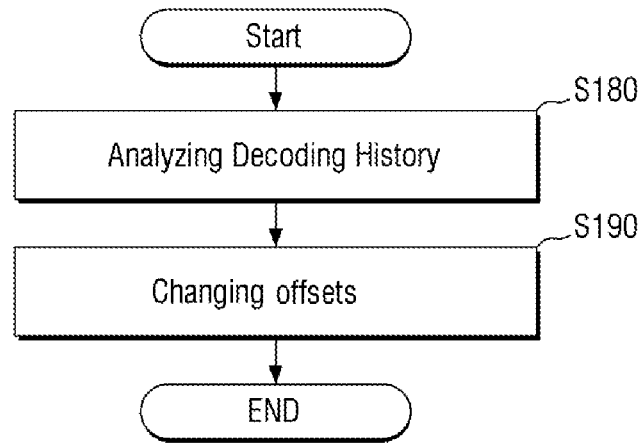
FIG. 14 is a flowchart diagram illustrating an operating method of a memory controller according to an embodiment of the present disclosure.

FIG. 14 illustrates an operating method of a memory controller according to an embodiment of the present disclosure. Substantially the same description as described with reference to FIGS. 12 and 13 is applicable, so duplicate description may be omitted.

Referring to FIG. 14, a decoding history is analyzed (step S180).

For example, as in FIG. 12 or FIG. 13, it may be checked which mapping method (e.g., any one of the mappings M31, M32, and M33) has succeeded in decoding among a plurality of decoding operations (e.g., steps S153a, S153b, and S153c). In addition, among a plurality of mapping methods, a decoding operation (e.g., step S153c) having the highest decoding success rate is found, and a mapping method (e.g., mapping M33) corresponding to the decoding operation (step S153c) is found.

Subsequently, based on the decoding history, a basic offset voltage for obtaining 3-bit soft decision data is changed to an offset voltage corresponding to the mapping M33. By changing the offset voltage in this way, the probability of invalidation of the decoding operation (see step S152 of FIG. 10) using 3-bit soft decision data may be significantly reduced. If the decoding operation (see step S152 of FIG. 10) succeeds (see step S162 of FIG. 10), there is no need to additionally request (see S113 in FIG. 10) and receive 4-bit soft decision data after the success. Therefore, it is possible to minimize the load and/or time required for reading and decoding.

In concluding the detailed description, those of ordinary skill in the pertinent art will appreciate that many variations and modifications can be made to the embodiments described herein without substantially departing from the scope or principles of the present disclosure. Therefore, the disclosed embodiments of the disclosure are used in a generic and descriptive sense, and not for purposes of limitation.

What is claimed is:

1. An operating method of a memory controller, comprising:
performing a first decoding using a first decision data of N bits prepared through communication with the memory device, where the first decision data corresponds to a first area of the memory device, N is a natural number;
if the first decoding invalidates, preparing a second decision data of M bits through communication with the memory device, where the second decision data corresponds to the first area of the memory device, M is a natural number greater than N;
mapping the M-bit second decision data to N-bit third decision data;
performing a second decoding using the third decision data.

2. The operating method of claim 1, further comprising, if the second decoding invalidates:
mapping the M-bit second decision data to N-bit fourth decision data different from the third decision data; and
performing a third decoding using the fourth decision data.

3. The operating method of claim 1, wherein:
the third decision data corresponds to a first offset voltage,
the fourth decision data corresponds to a second offset voltage different from the first offset voltage,
N is equal to or greater than 2.

4. The operating method of claim 3, wherein if a decoding success rate using the fourth decision data is higher than a decoding success rate using the third decision data, a basic offset voltage for obtaining N-bit decision data from the memory device is changed to the second offset voltage.

5. The operating method of claim 1, further comprising, if the third decoding using the fourth decision data invalidates:
mapping the M-bit second decision data to N-bit fifth decision data different from the third and fourth decision data; and
performing a fourth decoding using the fifth decision data, wherein M is equal to or greater than 3.

6. The operating method of claim 1, wherein the preparing a second decision data of M bits comprises:
receiving N-bit decision data through communication with the memory device.

7. The operating method of claim 6, wherein the preparing a second decision data of M bits further comprises:
receiving additional N-bit decision data through communication with the memory device.

8. A storage device comprising:
a memory device; and
a memory controller configured to:
perform a first decoding using a first decision data of N bits prepared through communication with the memory device, where the first decision data corresponds to a first area of the memory device, N is a natural number;

if the first decoding invalidates, prepare a second decision data of M bits through communication with the memory device, where the second decision data corresponds to the first area of the memory device, M is a natural number greater than N, map the M-bit second decision data to N-bit third decision data, and perform a second decoding using the third decision data.

9. The storage device of claim 8, the memory controller further configured to:

if the second decoding invalidates, map the M-bit second decision data to N-bit fourth decision data different from the third decision data; and perform a third decoding using the fourth decision data.

10. The storage device of claim 8, wherein:

the third decision data corresponds to a first offset voltage, the fourth decision data corresponds to a second offset voltage different from the first offset voltage, N is equal to or greater than 2.

11. The storage device of claim 10, wherein if a decoding success rate using the fourth decision data is higher than a decoding success rate using the third decision data, a basic offset voltage for obtaining N-bit decision data from the memory device is changed to the second offset voltage.

12. The storage device of claim 8, the memory controller further configured to:

if the third decoding using the fourth decision data invalidates, map the M-bit second decision data to N-bit fifth decision data different from the third and fourth decision data; and perform a fourth decoding using the fifth decision data, wherein M is equal to or greater than 3.

13. The storage device of claim 8, wherein the preparing a second decision data of M bits comprises:

receiving N-bit decision data through communication with the memory device.

14. The storage device of claim 13, wherein the preparing a second decision data of M bits further comprises:

receiving additional N-bit decision data through communication with the memory device.

* * * * *